(12) United States Patent
Patt et al.

(10) Patent No.: US 7,279,814 B2
(45) Date of Patent: Oct. 9, 2007

(54) MOVING COIL ACTUATOR FOR RECIPROCATING MOTION WITH CONTROLLED FORCE DISTRIBUTION

(75) Inventors: Paul J. Patt, Danville, CA (US); Daniel Y. Chu, Hercules, CA (US); Jeffry Ceremony, Fairfield, CA (US)

(73) Assignee: Bio-Rad Laboratories, Inc., Hercules, CA (US)

( * ) Notice: Subject to any disclaimer, the term of this patent is extended or adjusted under 35 U.S.C. 154(b) by 163 days.

(21) Appl. No.: 11/265,000

(22) Filed: Nov. 1, 2005

(65) Prior Publication Data

US 2007/0096568 A1 May 3, 2007

(51) Int. Cl.
*H02K 33/00* (2006.01)

(52) U.S. Cl. .......................... 310/15; 310/12
(58) Field of Classification Search ............ 310/12–15, 310/17, 22, 179, 208
See application file for complete search history.

(56) References Cited

U.S. PATENT DOCUMENTS

| | | | |
|---|---|---|---|
| 3,816,776 A * | 6/1974 | Chari ........................... | 310/13 |
| 5,321,762 A | 6/1994 | Stuart | |
| 5,459,325 A | 10/1995 | Hueton et al. | |
| 6,091,167 A * | 7/2000 | Vu et al. ..................... | 310/12 |
| 6,355,934 B1 | 3/2002 | Osgood et al. | |
| 6,545,264 B1 | 4/2003 | Stern | |
| 6,703,727 B2 | 3/2004 | Miller | |
| 6,710,353 B1 | 3/2004 | Loopstra | |
| 6,787,943 B2 | 9/2004 | Godkin | |
| 6,815,846 B2 | 11/2004 | Godkin | |
| 6,870,285 B2 | 3/2005 | Godkin | |
| 6,894,408 B2 | 5/2005 | Godkin | |
| 7,042,119 B2 * | 5/2006 | Miyashita et al. ............ | 310/12 |
| 2002/0130561 A1 * | 9/2002 | Temesvary et al. ........... | 310/12 |
| 2003/0173832 A1 * | 9/2003 | Hassan et al. ................ | 310/12 |
| 2005/0023905 A1 * | 2/2005 | Sakamoto ..................... | 310/12 |
| 2007/0119945 A1 * | 5/2007 | Chu ....................... | 235/462.32 |

* cited by examiner

*Primary Examiner*—Thanh Lam
(74) *Attorney, Agent, or Firm*—Townsend and Townsend and Crew LLP; Henry Heines (57) ABSTRACT

A moving coil actuator that moves in a rapid back-and-forth motion is constructed with a magnet assembly that concentrates the magnetic flux in a region of limited length and with a coiled electric conductor that includes two separated regions of densely wound coil, the assembly and conductor arranged such that only one of the coil regions resides in a concentrated flux region at either end of the actuator stroke. This is achieved with either a single region of concentrated flux or two spatially separated regions of concentrated flux. In either case, the force constant, i.e., the motor force generated in each coil per unit of current through the coil, is non-linear, with a maximal force at each end of the stroke and a minimal force at the stroke mid-point. The result is an efficient use of the electric current and relatively small amounts of materials of construction, and accordingly less weight for the actuator to carry during its travel and its changes of direction.

18 Claims, 8 Drawing Sheets

MOVING COIL ACTUATOR FOR RECIPROCATING MOTION WITH CONTROLLED FORCE DISTRIBUTION

BACKGROUND OF THE INVENTION

1. Field of the Invention

This invention relates to scanning systems for microarrays of biological species such as nucleic acids or proteins, and for any type of procedure or analysis where very rapid illumination, observation, and/or detection is performed at a large number of individual sites arranged in a regular two-dimensional array. In particular, this invention relates to moving coil actuators as a driving mechanism for reciprocating motion of an optical system.

2. Description of the Prior Art

Microarrays are two-dimensional arrays of sites that are often of microscopic dimensions, with a different molecular species adhered to each site. These arrays are placed on glass slides, microtiter plates, membranes, and other two-dimensional supports, and one of their widest uses is in binding assays for the identification or characterization of an unknown biological species or the analysis of a sample for its inclusion of species that have certain binding affinities. The placement of a microarray on a support is typically done with sophisticated printing procedures and can be done on a very large scale. A single glass slide can contain a microarray of 10,000 genes, for example. Microarrays are extremely useful in the performance of multiplex experiments at high speed to obtain both qualitative and quantitive results. In a typical binding assay performed on a microarray, the individual spots of the array contain different DNA fragments, and the entire array is placed in contact with a sample containing an unknown DNA or other DNA-binding species that has been labeled to emit a luminescent signal when exposed to excitation light. Excitation and detection are then performed by way of an optical system that scans the microarray by traveling across individual rows of spots in succession, or by moving the microarray relative to the optical system with the same result. A laser-equipped scanning head is typically used for excitation.

One of the methods for producing the back-and-forth motion of a scanning head across successive rows in a two-dimensional array is by the use of a moving coil actuator. Moving coil actuators utilize the well-known Lorentz force to offer high speed movement and a high degree of control and variability, and can be manufactured to meet precise specifications. The moving coil actuators that are commonly used for scanning heads are voice coil actuators, which are direct-drive, limited-motion devices that utilize a permanent magnetic field and an electric coil to produce a force proportional to the current applied to the coil. Examples of voice coil actuators in current use include various products from the Kimco Magnetics Divison of BEI Technologies, Inc., San Marcos, Calif., USA, and from H2W Technologies, Inc., Valencia, Calif., USA. Disclosures of voice coil actuators are found in U.S. Pat. Nos. 6,894,408, 6,870,285, 6,815,846, and 6,787,943.

A moving coil actuator derives its effectiveness in part from a high force-to-mass ratio, which produces high acceleration of both the actuator and a payload. In scanners, the payload is typically a mirror and lens assembly plus any necessary holders or bearings. The force-to-mass ratio is proportional to the product of the magnetic field across the conductor and the current density in the conductor, divided by the mass density of the coil and payload. The peak current density is limited by thermal considerations arising from heating of the coil, since electrical resistivity in the coil rises with increasing temperature, and increases in the current density cause the temperature to rise. Heat accumulation is thus detrimental to the efficiency of the actuator. Heat can also cause dimensional distortion of the attached payload, and when the payload contains optical components, this can destroy optical alignment. Another factor affecting the efficiency of a moving coil actuator is the size and strength of the magnet. The cost of the magnet is directly proportional to the desired field strength and to the gap width.

Because of the movement of the coil relative to the magnetic poles, the force constant of the actuator, i.e., the motor force per unit of input current, varies with the position of the coil along its length of travel. In the simplest voice coil actuators where the coil and magnetic field are coextensive, the coil is only fully within the magnetic field when the coil is at the center of its travel. The force constant is thus at its peak in this position and tapers off toward the two ends of the travel. The greatest force is needed at the ends of the travel, however, since it is at the ends that the inertial forces must be overcome in order to reverse the direction of travel. To achieve this result, the tapering off of the force can be eliminated either by using a coil that is longer than the magnet or vice versa, and limiting the length of travel so that a constant length of coil remains in the magnetic field. This gives rise to two configurations, one of which is termed "underhung" and the other "overhung." In the "underhung" configuration, the magnetic poles extend beyond the coil length, allowing the coil to travel the full length of the poles without loss of the influence of the magnetic flux on the coil. In the "overhung" configuration, the coil extends beyond the magnetic poles, and the range of movement of the coil extends from one extreme in which one end of the coil is aligned with the poles to the other extreme in which the other end of the coil is aligned with the poles, with different portions of the coil, although all of the same length, lying within the magnetic field at different points along the length of travel. The underhung and overhung configurations are also means of extending the length of travel of the coil, i.e., the stroke.

While the underhung and overhung configurations achieve these goals, each has its limitations. The underhung configuration requires a relatively large amount of magnetic material, which is a major component of the cost of the actuator. In addition, the excess magnet length reduces heat dissipation from the coil causing a rising temperature which contributes to the increase in resistance as electric current continues to travel through the coil. The overhung configuration requires the actuator to move a relatively high mass of coil, thereby requiring excess force to achieve the same range of movement. In addition, the added coil length presents greater resistance to the electric current, thereby requiring a higher voltage and causing more resistance heating to occur within the coil. Furthermore, both the underhung and overhung designs produce a force constant that is substantially constant along the length of travel, without additional force at the ends of the stroke where greater force is needed to reverse the direction of the coil.

One of the difficulties with scanners in general is that the greatest driving force is needed at the ends of the stroke, i.e., the extreme ends of the linear scanner travel path, where the direction of the scanner is reversed. The force requirements at the ends of the stroke are determined primarily by the need to overcome inertia rather than to overcome viscosity. The payload does not vary with time, however, nor does the desired velocity pattern. Accordingly, while conventional moving coil actuators are linear, i.e., the force that they generate is proportional to the current applied to the coil, this linearity is neither essential nor desirable.

SUMMARY OF THE INVENTION

These and other limitations of the prior art are addressed by the present invention, which resides in a moving coil actuator whose construction includes a magnet assembly with a gap within which are one or more regions of limited length in which magnetic flux is concentrated, plus a coiled electric conductor that has two coil regions separated either by no coil or by a coil of lower winding density than either of the two coil regions. The gap is large enough to receive the coiled electric conductor, either in whole or in part, with sufficient clearance to allow the conductor to travel back and forth within the gap, such that at each end of the length of travel one of the two coil regions is within a concentrated flux region and the other is not within a concentrated flux region. One of the two coil regions is thus exposed to a concentrated magnetic flux at one end of the length of travel and the other coil region is similarly exposed to a concentrated magnetic flux at the other end. The combined effect of concentrating the magnetic flux to a region of limited length and using two electric coils separated along the direction of travel provides the unique result of allowing the actuator to apply a maximal motor force to the payload at the ends of the stroke and a minimal motor force at the midpoint between the two ends.

This invention is embodied in a number of variations that offer different yet distinctive benefits. In certain embodiments, the magnet assembly forms only one concentrated flux region, and the two electric coil regions are arranged such that one coil resides in the concentrated flux region at each end of the stroke. The length of the stroke in this case is defined by the separation between the two coils. In certain other embodiments, the magnet assembly forms two concentrated flux regions spaced apart by a distance that does not equal, and is preferably greater than, the distance between the two coil regions. At one end of the stroke, one of the coil regions resides within one of the concentrated flux regions, and at the other end, the other coil region resides within the other concentrated flux region. At no point in time do both coil regions reside within concentrated flux regions. The length of the stroke is equal to the difference between the separation of the two concentrated flux regions and the separation of the two coil regions.

An advantage offered by all embodiments of this invention is that the magnetic field generated by expensive field-producing materials, including permanent magnets and magnetic flux-conducting metals, is maximized and focused in regions where the highest forces are needed. The extra coil windings and/or magnetic material, included in actuators of the prior art to maintain a linear force response to the applied current, are now removed. This lowers the resistance of the coils as seen at the power supply, thereby allowing for higher peak currents, and it allows the system to limit the generation of force and power to locations where they are most needed. The weight of the actuator components, the power consumption, and the cost are all reduced relative to the prior art. This invention also allows the two coils to be energized individually at different times, i.e., each for only half the time that current is needed. A still further advantage is the ability to use a relatively small amount of magnetic material to achieve flux concentration in a region (or regions) of limited length within the gap. A still further advantage is the ability to leave one or both of the coil regions uncovered for a significant portion of the stroke, thereby allowing greater heat dissipation and higher peak current density. Still further advantages, embodiments, features, and objects of the invention will be apparent from the description that follows.

DETAILED DESCRIPTION OF THE INVENTION AND PREFERRED EMBODIMENTS

The electric coil portion of an actuator of the present invention includes two electric coil regions that are spatially separated, with either no coil between them or a coil of lower winding density than that of either of the two coil regions. In either case, the Lorentz force generated in the region separating the two electric coil regions is either zero or substantially and significantly lower than the Lorentz forces generated in the coil regions when those regions are in areas of concentrated magnetic flux. The expression "no coil" denotes either the absence of any electrical connection between the two coil regions or the presence of an uncoiled electrical connection, such as a straight connecting wire, that has at most a negligible effect on the motor force of the actuator. When the two coil regions are separated by a coil of lower winding density, the Lorentz force generated in the connecting region is again substantially lower than the Lorentz forces generated in the more dense coil regions. In this specification, the terms "coil of low winding density" and "low-density coil" are equivalent and used interchangeably, and the terms "coil of high winding density" and "high-density coil" are likewise equivalent and used interchangeably.

Differences in winding density can be achieved by introducing separations between adjacent turns of a coil and varying the separation widths of the separations, or by using layered windings and varying the number of layers between different regions of the coil, all within the scope of this invention. Differences in winding density within the scope of this invention can also be achieved by stepwise changes in the number of layers of a multi-layered coil or in the separation between adjacent turns in a single-layer coil, or by graduated or gradual differences in the number of layers or the separation. The differences can thus be continuous or approximately continuous between the regions of high winding density and low winding density, or stepwise with a uniform winding density within the confines of each region. The degree of difference in winding density between the high-density and low-density regions is not critical to the invention and can vary with the needs of the system. In most cases, best results will be achieved when the ratio of winding densities in the high-density to low-density regions is from about 2:1 to about 20:1, and preferably from about 3:1 to about 10:1. When the difference is achieved by coils of different numbers of layers, the high-density regions are preferably from 1 to 10 layers each in thickness with either fewer layers in the low-density regions (if two or more layers in the high-density regions) or fewer effective turns per layer (if only one layer in the high-density regions), or more preferably 2 to 6 layers in each high-density region and a single layer in the low-density region(s). Effective results can also be obtained with a winding density in the low-density region(s) that is less than one-half of the winding density in the high-density regions. In certain embodiments of this invention, each of the high-density coil regions is contemplated to be at least approximately equal in length to the concentrated flux region where the coil region will reside at the end of the stroke. In these embodiments, the differences in winding density between the high-density coil regions and the adjacent regions are preferably achieved by stepwise changes.

In those embodiments of this invention in which the magnet assembly forms only a single region of concentrated magnetic flux, the spatial region along the coil carrier that separates the two high-density coils will pass through the region of concentrated magnetic flux as the coil carrier is traveling between the two ends of the stroke. In those embodiments in which a separate region of concentrated magnetic flux is present for each of the two high-density coils, the only regions along the coil carrier that will pass through either concentrated flux region between the two ends of the stroke are those at the outer ends of the high-density coils. In either case, it may be desirable to place a low-density coil in a region or regions of the coil carrier that will pass through the concentrated flux region between the two ends of the stroke. The combination of high-density and low-density coils can be used to produce a continuous motor force although of lower magnitude when the low-density coil is in the concentrated flux region. Preferably, the motor force will be a maximum at the extremities of the travel path and a minimum at the center where the dominating forces are viscous and damping forces. In those embodiments that utilize a single region of concentrated magnetic flux, therefore, a low-density coil can connect the two high-density coils, while in those embodiments that utilize two regions of concentrated magnetic flux, low-density coils can be placed at the outer ends of the two high-density coils.

The region(s) of concentrated magnetic flux and the high-density coil regions are each of limited length, and distance traveled by the high-density coil regions during each stroke that is greater than the widths of these regions. The high-density coil regions thus travel into and out of the concentrated magnetic flux regions during each stroke. As a result, the "force constant" of the actuator is not proportional to the current over the length of travel of the coils. The actuators of this invention are thus non-linear, as distinct from linear actuators of the prior art. The force in the actuators of the present invention is greatest when one of the high-density coils is fully within a region of concentrated magnetic flux, which occurs at each end of a stroke.

The magnetic material used in the magnet assembly can be any conventional magnetic material that is commonly used in voice coil actuators of the prior art. The magnet can be a permanent magnet or an electromagnet. Permanent magnets are preferred. The dimensions of the region(s) of concentrated magnetic flux are determined by the size, shape, and placement of the magnetic poles, matters that will be readily apparent to those skilled in magnet materials and construction. In all cases, however, the poles are arranged such that the magnetic flux is perpendicular to the axis of the coil. In preferred configurations, the magnetic flux is radial with flux lines extending toward or away from the coil axis and continuing around the full circumference of the coil. The resulting Lorentz force is along the coil axis. The magnet assembly is a structural member that supports the magnetic poles and holds them in position with the gap between them that is large enough to accommodate the reciprocating movement of the coils. In embodiments where two regions of concentrated magnetic flux are present, the magnet assembly can consist of two spatially separated halves, each with a pair of poles and a gap to receive the coils. The space between the two halves of the magnet assembly allows increased exposure of the coils to the surrounding atmosphere to help dissipate heat from the coils.

The coil carrier can be any structural member, such as a cylinder or bobbin for example, that supports a coil. The carrier should be as thin and as lightweight as possible. The carrier is preferably hollow so that a pole of the magnet can extend into the interior of the coil. A hollow thin-walled cylinder can be fabricated by winding a thin sheet into a tube or tube section, or by any conventional technique that will be readily apparent to those skilled in the art. In presently contemplated embodiments, the cylinder wall is from about 25 microns to about 150 microns in thickness. When split or multiple coils are present, all coils will be coaxial and arranged end-to-end, with separations where appropriate, along the axis. The coils can be of any electrically conductive material. Metals commonly used for conducting electricity can indeed be used. Prominent examples are aluminum and copper. Parameters such as the wire gauge, coil diameter, coil length, carrier length, current magnitude, and current profile will all vary with the needs of the system which the actuator is designed to drive. Wire of from 10 gauge to 40 gauge, for example, preferably from 20 gauge to 30 gauge, will in many cases provide the best results. Presently contemplated embodiments utilize wire of 25, 26, 27, or 28 gauge. Illustrative coil diameters are within the range of about 1 cm to about 10 cm internal coil diameter, preferably about 2 to about 4 cm, with about 2.5 cm currently contemplated. The length of travel of the coils, i.e., the stroke length, is contemplated in most cases to be from about 10 mm to about 50 mm, preferably from about 25 to about 30 mm. The weight of the coil and carrier combined can for example range from about 3 g to about 30 g, and is presently contemplated to be within the range of about 10 g to about 15 g. The payload, which includes the optics components in those embodiments where the actuator is designed to produce travel of a scanning head with optics components, will typically weight from about 1 g to about 20 g, and as presently contemplated from about 2.5 g to about 10 g.

Other parameters that characterize a moving coil actuator include the peak value of the "force constant" (the "force constant" is the force produced in the coil per unit current), the β (beta) value, which is the square of the peak force constant divided by the electrical resistance, and the time constant, which is the total weight of the moving parts divided by the β value. All of these parameters and others with which those skilled in the art are familiar will vary among different embodiments of this invention, and specific values are not critical to the invention as a whole. Nevertheless, certain ranges will be most often used and will provide the most useful results. The force constant for example will vary over the length of travel as noted above, reaching its peak value at the ends of the stroke. The peak value in preferred embodiments ranges from about 1.5 to about 10 N/A (newtons per ampere), and most preferably from about 2 to about 5 N/A. The β value in preferred embodiments ranges from about 5 to about 50 $N^2/W$ (newtons squared per watt), and more preferably from about 8 to about 30 $N^2/W$. The time constant in preferred embodiments ranges from about 0.3 msec to about 10 msec, and most preferably from about 2 msec to about 5 msec.

Any of a wide variety of power sources known in the art can be used. Examples are linear amplifiers and switching or pulse width modulated amplifiers. The power source will be one that produces an electric current of alternating polarity, either as a square waveform or as a sinusoidal or specifically engineered waveform. The waveform can be generated by a closed-loop generator in conjunction with a position and/or velocity sensor. Alternatively, an open-loop or adaptive open-loop control system can be used. Preferred waveforms are those that include a peak at each terminus of the stroke, to deliver the maximum current at the turn-around. The frequency of the waveform and hence the frequency of the actuator can likewise vary, although in preferred embodiments the peak currents have a fundamental frequency of from about 3 Hz to about 30 Hz, and most preferably from about 10 to about 20 Hz. A currently contemplated frequency is approximately 10 Hz.

While the features defining this invention are capable of implementation in a variety of moving coil actuator designs, the invention as a whole will be best understood by detailed examinations of individual embodiments. Two such embodiments are shown in the drawings.

Figure 1:
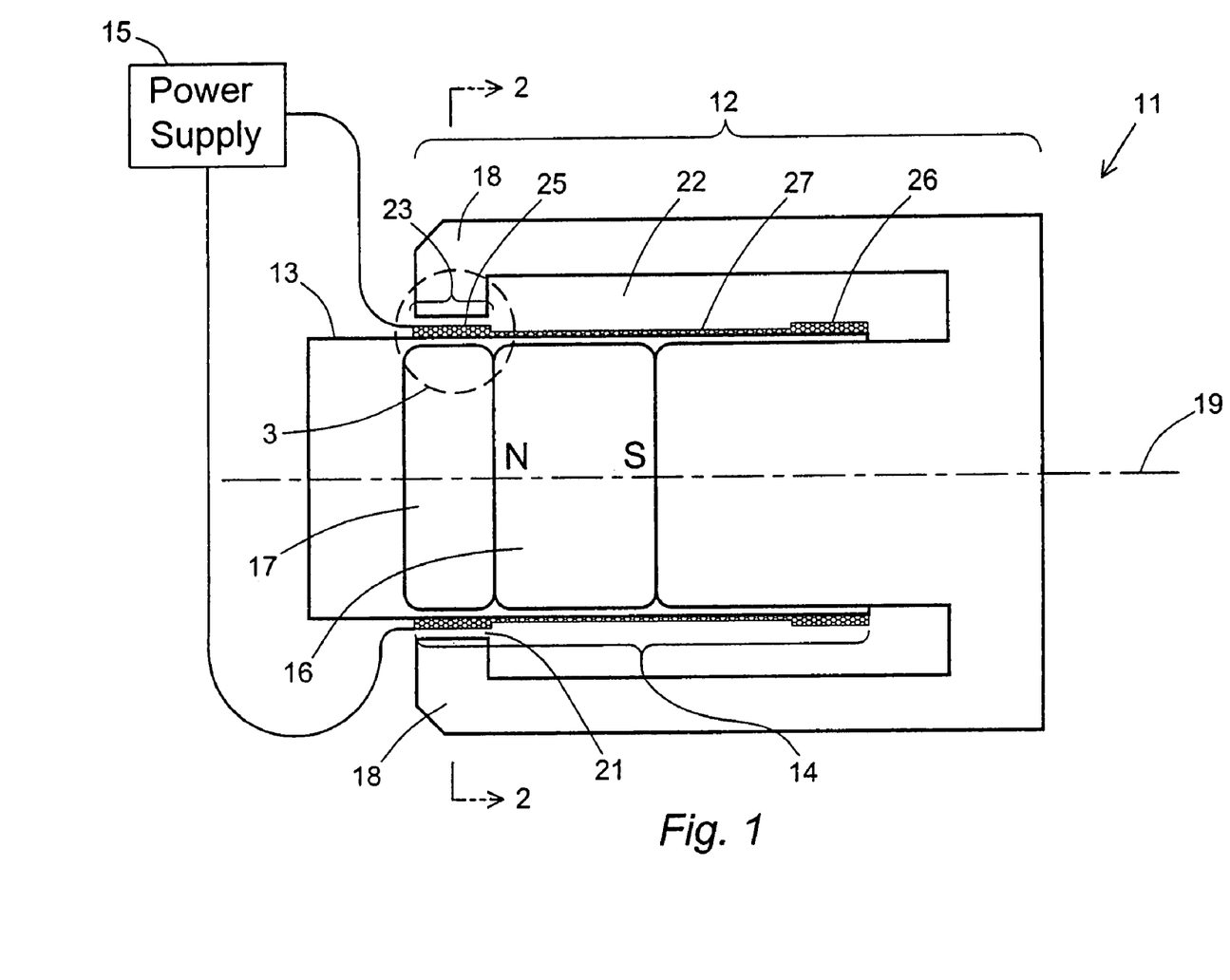
FIG. 1 is a cross section view of a moving coil actuator in accordance with the present invention, taken along the axis of the actuator.
Figure 2:
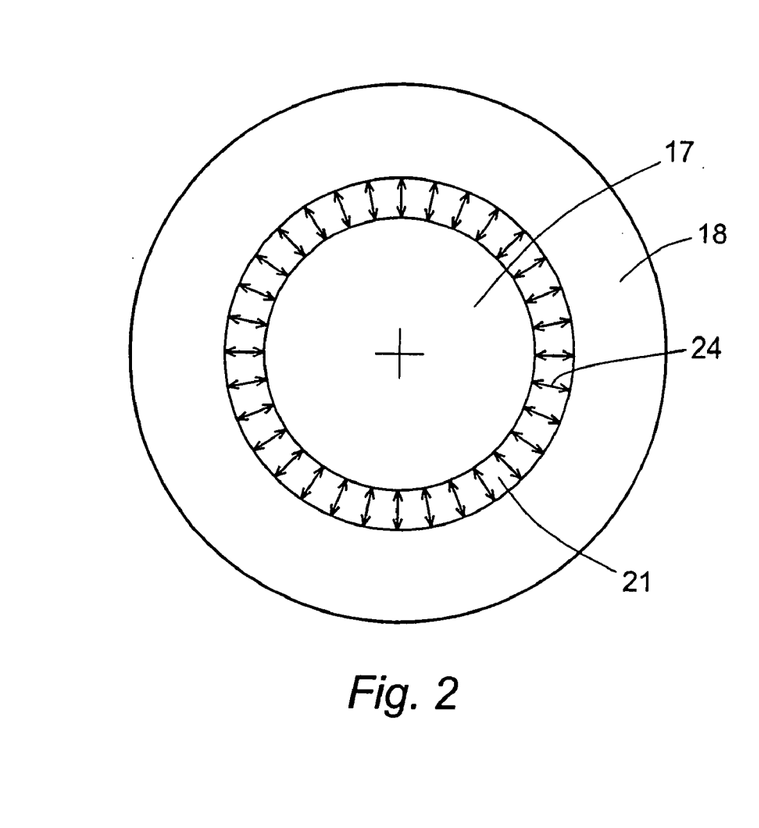
FIG. 2 is another cross section view of the actuator of FIG. 1, taken transverse to the axis.
Figure 3:
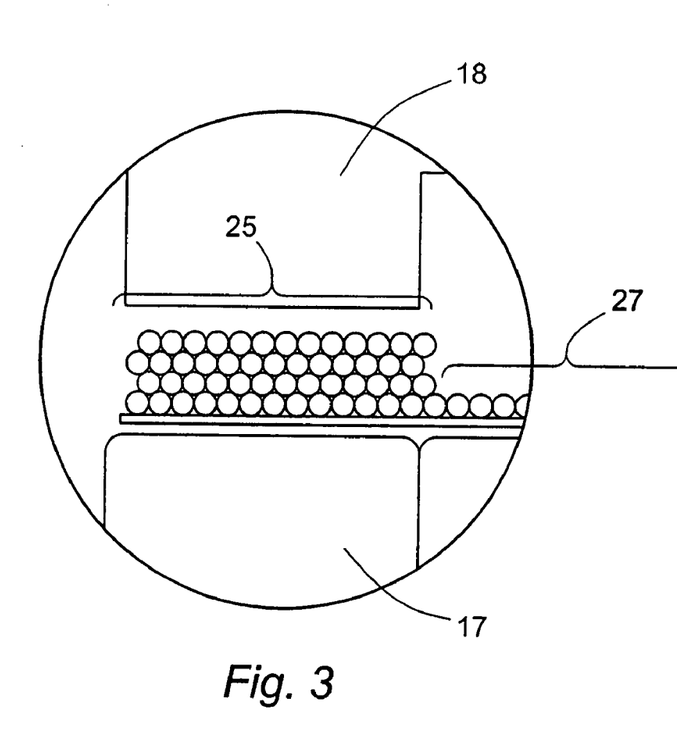
FIG. 3 is an enlarged view of Section 3 of FIG. 1.

One of these embodiments is shown in FIGS. 1, 2, 3, 4, and 5. The actuator in this embodiment is a single-ended design in which the magnet assembly is positioned at one end of the stroke path of the coil carrier. In this embodiment, a major portion of the coiled electrical conductor will be exposed to the surroundings, and thereby capable of improved heat dissipation, when the coil carrier is at one end of the stroke. FIG. 1 shows the actuator 11 at one end of the stroke path, the components of the actuator including the magnet assembly 12, an electric coil carrier 13, a coiled electric conductor 14, and a power supply 15. The magnet assembly includes a magnet 16 and pole pieces 17, 18, each pole piece being of magnetic flux conductive material such as, for example iron. The magnet 16 and pole pieces 17, 18 in this embodiment are bodies of revolution about a common axis 19, and the view shown in FIG. 1 is a cross section along a plane in which the axis lies. A transverse cross section, perpendicular to the axis at the location of the pole piece 17 is shown in FIG. 2. As shown in both FIGS. 1 and 2, an annular gap 21 exists between the pole pieces 17, 18. The gap 21 is wide enough to receive the coil carrier 13 and coil 14 and to allow them to move freely along the axis 19 and within a cavity 22 in the magnet housing. The pole pieces 17, 18 form a region of concentrated magnetic flux 23. The flux lines are along the directions indicated by the flux arrows 24 of FIG. 2 and are radial across the gap 21.

Returning to FIG. 1, the coiled electrical conductor 14 is a continuous coil consisting of two regions of high winding density 25, 26 separated by a region of low winding density 27. Although not shown, a single axial conductor traversing the low-density region can be present for convenience of fabrication to provide a return for the coil. The leftmost region of high winding density 25 is shown in an enlarged view in FIG. 3, which is an enlarged view of the section indicated by the dashed circle 3 in FIG. 1. The region of high winding density 25 shown in this enlargement is a multi-layered coil, shown here as containing four layers, while the region of low winding density 27 is a single-layered coil.

Figure 4:
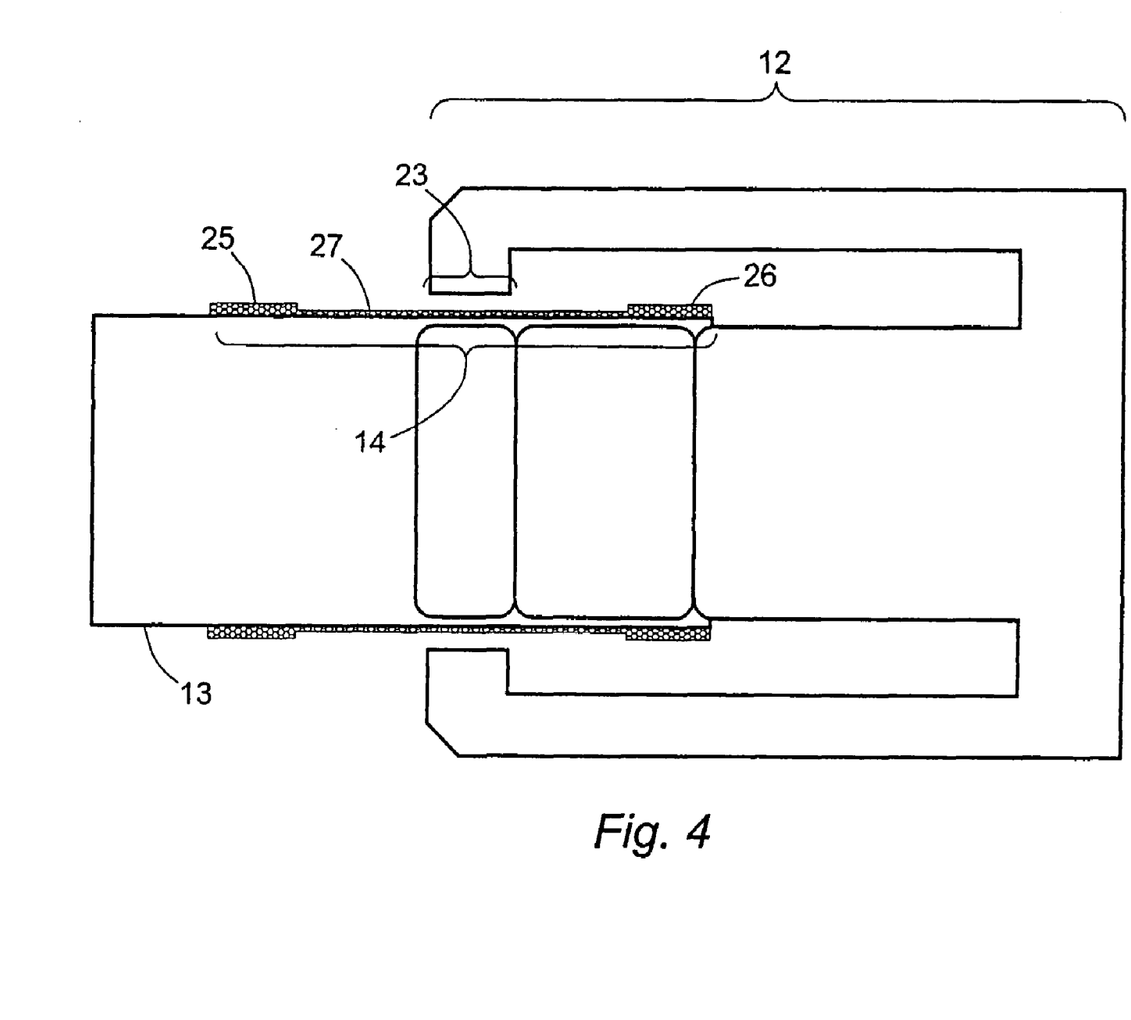
FIG. 4 is as view identical to that of FIG. 1, taken at mid-stroke.
Figure 5:
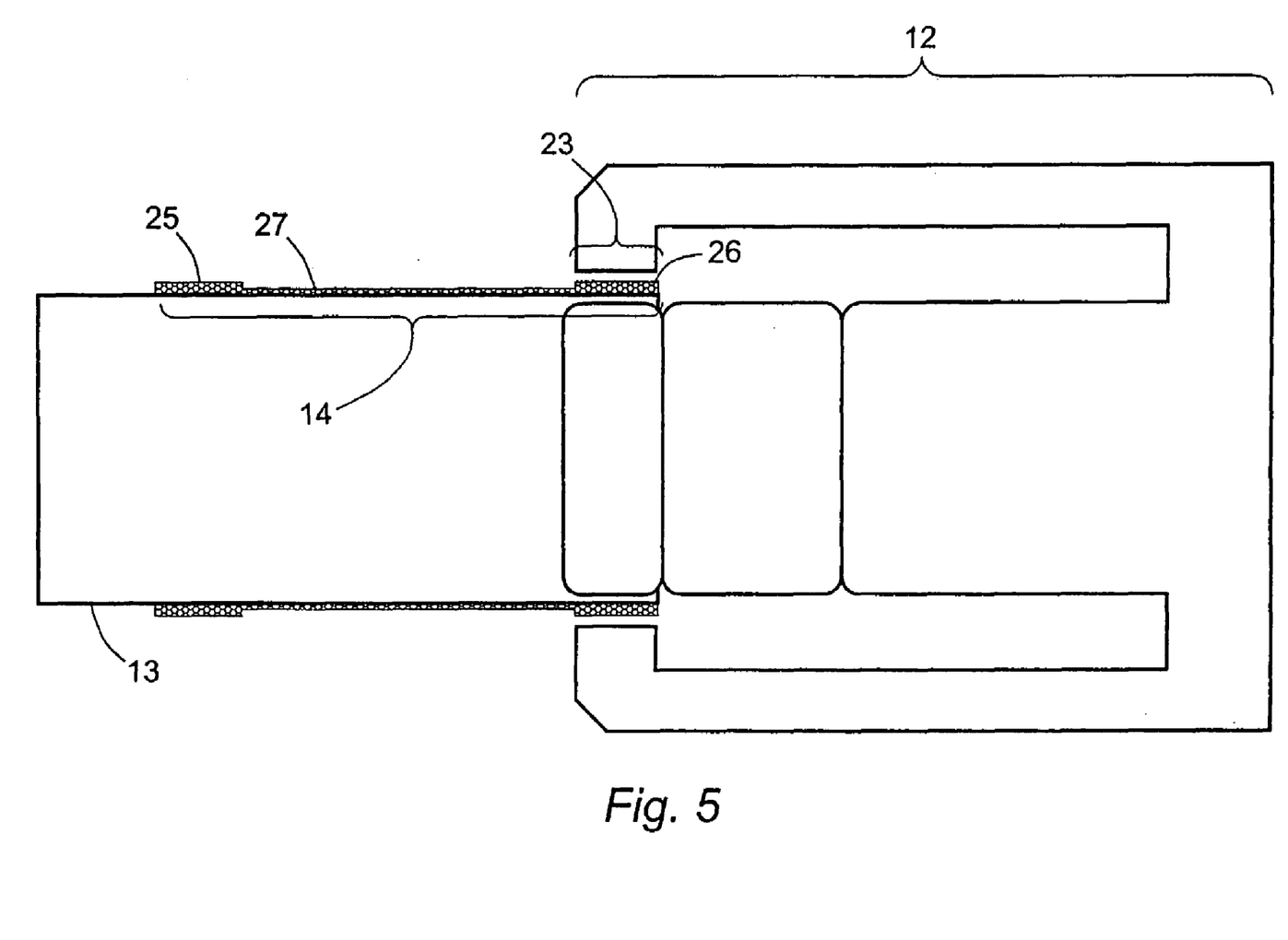
FIG. 5 is a view identical to those of FIGS. 1 and 4, taken at the end of the stroke opposite to that shown in FIG. 1.

In FIG. 1, the position of the coil carrier 13 relative to the magnet assembly 12 is one that places the leftmost region of high winding density 25 within the region of concentrated magnetic flux 23. In this position, the motor force created per unit of current through the coil 14 is at the high end of the motor force range since one of the two most dense coil regions is within the concentrated region of magnetic flux. FIGS. 4 and 5 are cross sections of the same actuator as FIG. 1, taken along the same plane. In FIG. 4, however, the coil carrier 13 and coil 14 are positioned in mid-stroke, in a partially extended position relative to the magnet assembly 12. In this position, neither of the two coil regions of high winding density are in the region of concentrated magnetic flux, and the motor force produced per unit of electric current is at the low end of the force range. In FIG. 5, the coil carrier 13 and coil 14 are positioned at the opposite end of the stroke path, with the rightmost region of high winding density 26 occupying the region of concentrated magnetic flux 23. In this position, the motor force created per unit of current through the coil 14 is again at the high end of the motor force range. At all points along the stroke path, a section of coil is within the region of concentrated magnetic flux 23, the passage of a current through the coil thereby generating, or capable of generating, a Lorentz force in the actuator at all times. The force constant however depends on whether the high-density or the low-density coil, or how much of each, is in the concentrated flux region. In the embodiment shown in FIGS. 1 through 5, the length of the stroke is approximately the center-to-center distance between the two high-density coil regions.

Figure 6:
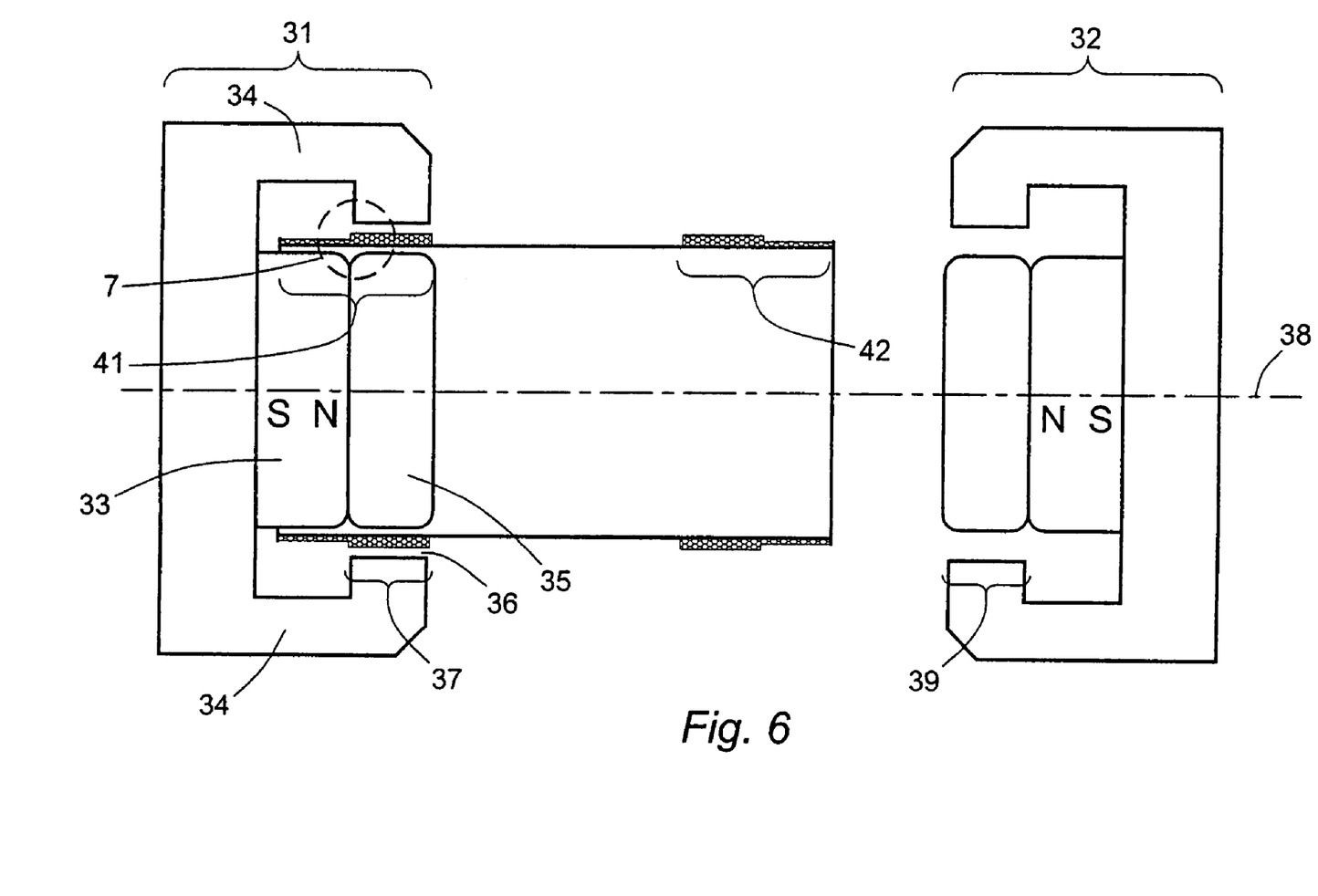
FIG. 6 is a cross section view of a second moving coil actuator in accordance with the present invention, taken along the axis of the actuator.

The second embodiment is shown in FIGS. 6, 7, 8, and 9. The actuator in this embodiment is a split-coil/split-magnet, or dual-ended, design in which the magnet assembly is split into two halves 31, 32, one positioned at each end of the stroke path of the coil carrier. Each half, as exemplified by the left half 31, includes a magnet 33 and pole pieces 34, 35, each pole piece being of magnetic flux conductive material, with a gap 36 between the pole pieces of sufficient width to accommodate the coils and to allow them to move back and forth within the magnet assembly. As in the embodiment of FIGS. 1 through 5, the pole pieces form a region of concentrated magnetic flux 37 across the gap 36. Also as in the embodiment of FIGS. 1 through 5, each half of the magnet assembly of FIG. 6 is a body of revolution about a central axis 38, with transverse cross sections at the concentrated magnetic flux region identical to that of FIG. 2. Two regions of concentrated magnetic flux 37, 39 are present, one in each half of the magnet assembly, and the magnetic flux lines in each of these regions are likewise identical to those of FIG. 2.

In the embodiment of FIGS. 6 through 9, the coiled electrical conductor is divided into two separate coils 41, 42. The coils are energized by a dual power source (not shown) to coordinate the magnitudes and directions of the currents in the two coils, but are otherwise not joined. This design has half the resistance, and twice the peak β value, of the single-ended version of FIGS. 1 through 5, but utilizes more magnet material and requires a second power supply (amplifier). This split-coil design is most suited to systems requiring a particularly small moving mass and greater symmetry about a bearing or support structure.

Figure 7:
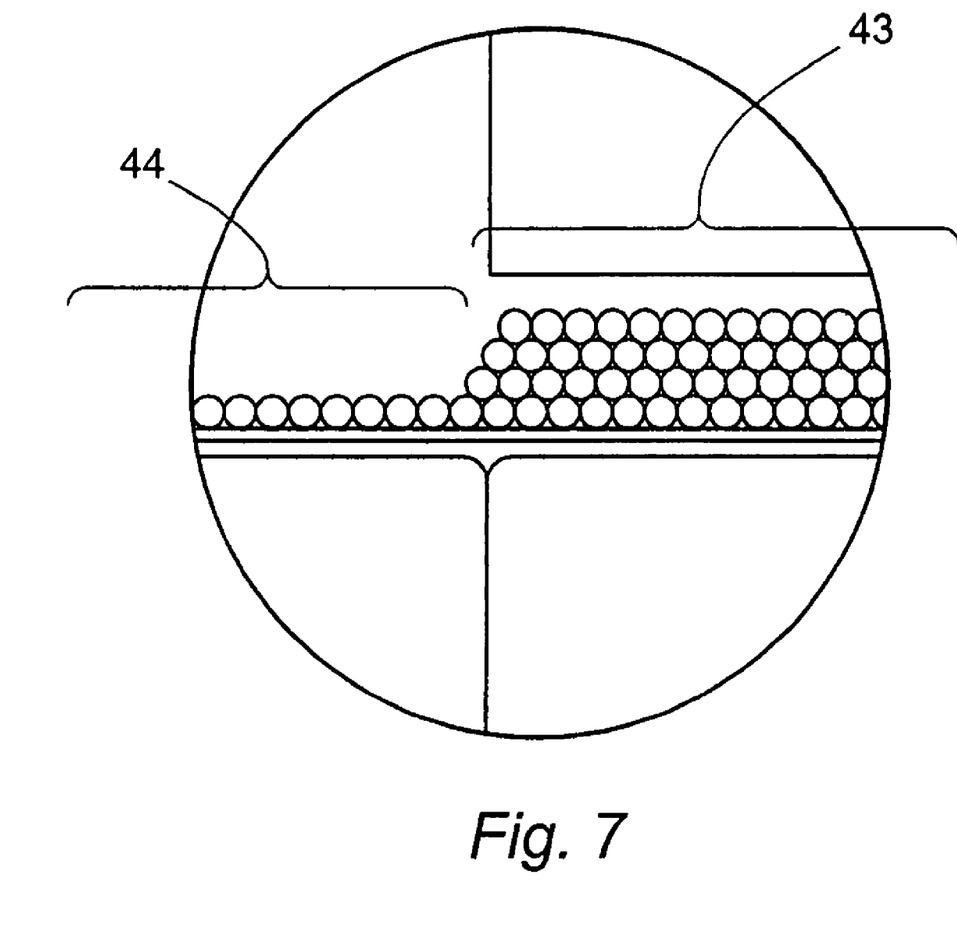
FIG. 7 is an enlarged view of Section 7 of FIG. 6.
Figure 8:
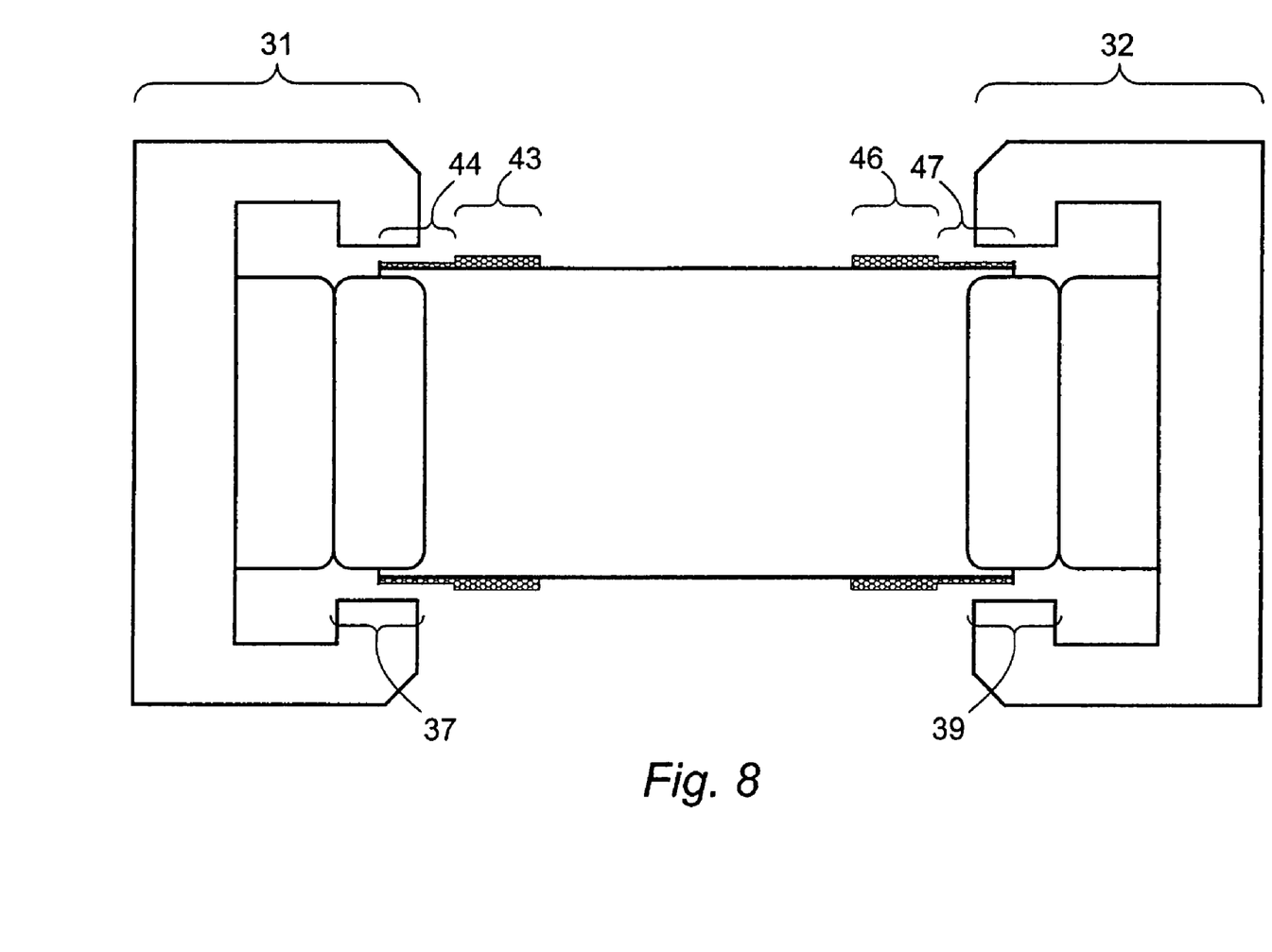
FIG. 8 is as view identical to that of FIG. 6, taken at mid-stroke.
Figure 9:
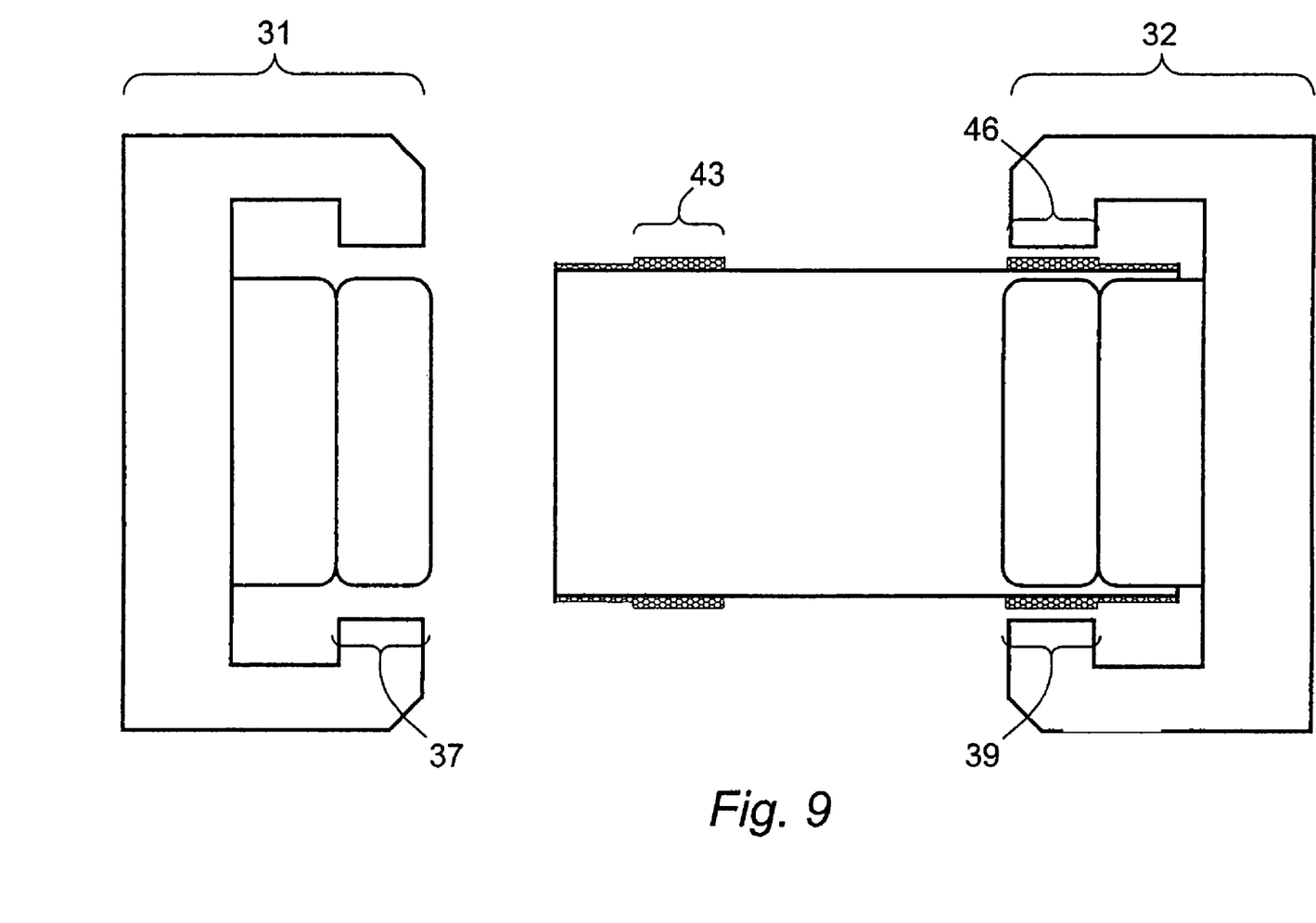
FIG. 9 is a view identical to those of FIGS. 6 and 8, taken at the end of the stroke opposite to that shown in FIG. 6.

FIG. 7 is an enlargement of the section within the dashed circle 7 of FIG. 6, and shows the electric coil within this section. This section contains the leftmost high-density coil 43 of the two high-density coils shown in FIG. 6. The high-density coil 43 reduces to a low-density coil 44 and the two are immediately adjacent to each other, but unlike the embodiment of FIGS. 1 through 5, the low-density coil 44 and its counterpart 47 adjacent to the rightmost high-density coil section 46 are both at the outer ends of the high-density coils rather than between the high-density coils. FIGS. 8 and 9 show the same cross section as FIG. 6 but at mid-stroke and at the opposite end of the stroke, respectively. At mid-stroke, as shown in FIG. 8, neither of the two high-density coil regions 43, 46 is within either of the two regions of concentrated magnetic flux 37, 39, while at the opposite end of the stroke, as shown in FIG. 9, the rightmost high-density coil region 46 is within the rightmost region of concentrated magnetic flux 39. The low-density coil sections 44, 47 pass through the regions of concentrated magnetic flux as the coils move between the two ends of the stroke path. Thus, despite the difference in configuration between this embodiment and that of FIGS. 1 through 5, a section of coil in this embodiment as well is within one of the two regions of concentrated magnetic flux 37, 39 at all points along the stroke path. The passage of a current through the coils thereby generates, or is capable of generating, a Lorentz force in the actuator at all times, but the force constant depends on whether a high-density or low-density coil, or how much of each, is in the concentrated flux regions. In the embodiment of FIGS. 6 through 9, the length of the stroke is less than the center-to-center distance between the two high-density coil regions, and is instead determined by the distance between the two regions of concentrated magnetic flux minus the distance between the two high-density coil regions. Each of the two coil assemblies has a separate power source, and the two power sources work in conjunction supplying power to the coil assemblies. Optionally, the power sources can be operated such that both power sources are energized simultaneously when the coil carrier is at a mid-point in its travel. This simultaneous use of the two power sources can minimize noise in the force production during the on-off transitions.

Further variations and embodiments will be apparent to those skilled in the art of moving coil actuators who have studied the drawings and descriptions offered above. Different configurations and geometries of the magnet housings and coil windings, for example, and a wide range of operating conditions and materials of construction, all within the scope of this invention will be readily apparent to the skilled engineer.

What is claimed is:

1. A moving coil actuator for high-speed scanning of a scanning area by a series of strokes successively traversing said scanning area, said actuator comprising:

an electric coil carrier with a coiled electrical conductor mounted thereto, said coiled electrical conductor comprised of first and second coil regions of first and second winding densities, respectively, said first and second coil regions located at opposite ends of a distance along said carrier equal to the length of one stroke and separated by a coil having a winding density lower than both said first and second winding densities;

a magnet assembly comprising magnetic poles and a gap, said magnetic poles configured to impose a magnetic flux across said gap, said magnetic flux concentrated in one or more regions defined as concentrated flux regions, said gap sized to receive said coiled electric conductor and to allow movement of said coiled electrical conductor along a path of travel terminating at one end in a position in which said first coil region, and not said second coil region, is within a concentrated flux region and at the other end in a position in which said second coil region, and not said first coil region, is within a concentrated flux region; and a power source connected to said coiled electrical conductor to produce an electric current therein of alternating polarity.

2. The moving coil actuator of claim 1 wherein said magnetic flux is concentrated in only one concentrated flux region within said gap.

3. The moving coil actuator of claim 1 wherein:

said magnetic flux is concentrated in two, and only two, concentrated flux regions, defined as first and second concentrated flux regions, and said path of travel terminates at one end in a position in which said first coil region is within first concentrated flux region and said second coil region is not within either of said concentrated flux regions, and at the other end in which said second coil region is within second concentrated flux region and said first coil region is not within either of said concentrated flux regions.

4. The moving coil actuator of claim 3 wherein said first and second concentrated flux regions are separated by a distance greater than the distance between said first and second coil regions.

5. The moving coil actuator of claim 2 wherein each of said first and second coil regions and said concentrated flux region are of equal axial lengths.

6. The moving coil actuator of claim 3 wherein said first coil region and said first concentrated flux region are of equal axial length, and said second coil region and said second concentrated flux region are of equal axial length.

7. The moving coil actuator of claim 2 wherein said coiled electrical conductor is comprised of said first and second coil regions are defined as first and second primary coil regions and are separated by an intermediate coil region defined as a secondary coil region and having a winding density less than both said first and second winding densities.

8. The moving coil actuator of claim 7 wherein said coiled electrical conductor comprises multilayered coils with numbers of layers tapering in directions from said primary coil regions to said secondary coil region.

9. The moving coil actuator of claim 7 wherein said coiled electrical conductor comprises multilayered coils with stepwise changes between said primary coil regions and said secondary coil region in the number of layers.

10. The moving coil actuator of claim 7 wherein said first and second primary coil regions are multilayered coils of from 1 to 10 coil layers each and said secondary coil region is a coil of fewer layers or fewer effective turns per layer than said first and second coil regions.

11. The moving coil actuator of claim 7 wherein said first and second primary coil regions are multilayered coils of from 2 to 6 coil layers each and said secondary coil region is a single-layer coil.

12. The moving coil actuator of claim 7 wherein said secondary coil region has a winding density that is less than half the winding densities of said first and second primary coil regions.

13. The moving coil actuator of claim 3 wherein said coiled electrical conductor is comprised of said first and second coil regions separated by no coil and said coiled electrical conductor further comprises outer coil regions at outer ends of said first and second coil regions, said outer coil regions having winding densities lower than both said first and second winding densities.

14. The moving coil actuator of claim 13 wherein said first and second coil regions are multilayered coils of from 1 to 10 coil layers each and said outer coil regions is a coils of fewer layers or fewer effective turns per layer than said first and second coil regions.

15. The moving coil actuator of claim 13 wherein said first and second coil regions are multilayered coils of from 2 to 6 coil layers each and said outer coil regions are single-layer coils.

16. The moving coil actuator of claim 13 wherein said outer coil regions have less than winding densities that are less than half the winding densities of said first and second coil regions.

17. The moving coil actuator of claim 1 wherein said electric coil carrier and coiled electrical conductor have a combined mass of from about 3 g to about 30 g.

18. The moving coil actuator of claim 1 wherein said actuator has a time constant of from about 0.3 millisecond to about 10 milliseconds.

* * * * *